United States Patent [19]
Peitsmeier et al.

[11] Patent Number: 4,925,210
[45] Date of Patent: May 15, 1990

[54] ADJUSTING DEVICE TO VARY THE INCLINATION OF A STEERING COLUMN OF A MOTOR VEHICLE

[75] Inventors: Karl Peitsmeier, Neuhausen; Gottfried Schremmer, Tamm, both of Fed. Rep. of Germany

[73] Assignee: Daimler-Benz AG, Stuttgart, Fed. Rep. of Germany

[21] Appl. No.: 266,675

[22] Filed: Nov. 3, 1988

[30] Foreign Application Priority Data

Nov. 3, 1987 [DE] Fed. Rep. of Germany ....... 3737225

[51] Int. Cl.$^5$ .............................................. B62D 1/18
[52] U.S. Cl. ..................................... 280/775; 74/493; 74/541
[58] Field of Search ..................... 74/493, 484 R, 541; 280/775

[56] References Cited

U.S. PATENT DOCUMENTS 4,299,407 11/1981 Simson ................................. 280/775
4,691,587 9/1987 Farrand et al. ..................... 280/775
4,785,684 11/1988 Nishikawa et al. ................ 280/775

Primary Examiner—Richard A. Bertsch
Attorney, Agent, or Firm—Barnes & Thornburg

[57] ABSTRACT

An adjusting device to vary the inclination of a steering column of a motor vehicle comprises a rectangular frame which surrounds a casing tube accommodating the steering column, braces the same against the vehicle body and acts additionally as a guide lever for pivotal adjusting movement of the steering column. A motor driven adjusting mechanism is anchored at a fixed angle to the frame and to the casing tube and operates to pivotally adjust the steering column inclination.

11 Claims, 2 Drawing Sheets

ADJUSTING DEVICE TO VARY THE INCLINATION OF A STEERING COLUMN OF A MOTOR VEHICLE

BACKGROUND AND SUMMARY OF THE INVENTION

The invention relates to an adjusting device for varying the inclination of a steering column of a motor vehicle of the type which controls a pivoting movement of the steering column about a pivot bearing arranged remotely from a steering wheel at a lower region of the steering column. The movement of the steering column can be effected by an adjusting mechanism which acts in a straight line in the direction of the inclination adjustment and which is connected to a casing tube accommodating the steering column in an upper region of the steering column near the steering wheel, whereby the steering column can be braced against the vehicle body in this upper region, and wherein a sliding stroke of this connection relative to the vehicle body which is dictated by the pivoting movement is permitted bY a guide lever mounted articulately to the vehicle body and acting articulately relative to the steering column.

An adjusting device of this general type is described in DE-PS 3,536,285. According to the latter a steering column, which is pivotable about an end pivot bearing and which is accommodated by a casing tube surrounding it, is variable in inclination by an adjusting mechanism connected to the casing tube in a region near the steering wheel and acting in a straight line. This adjusting mechanism also braces the steering column against the vehicle body in this upper region. The upper bracing is particularly important for the load capacity of the steering column when a force is introduced into the steering wheel, for its low vibration mounting and for a definite deformation resistance when impact forces are introduced into an impact absorber connected to the steering wheel during an accident.

However, the problem arises with this bracing arrangement that the connection of the adjusting mechanism and casing tube travels a sliding stroke relative to the vehicle body which is dictated by the pivoting movement about the pivot bearing remote from the steering wheel, so that the adjusting mechanism cannot simply be connected rigidly to the casing tube and to the vehicle body but that a steering or guiding lever which permits this sliding must be provided In the above-mentioned German patent this guide lever function is associated with the adjusting mechanism, which has to be fastened articulately at both ends and constructed adjustably in its adjusting movement for this purpose. The entire adjusting mechanism changes its position relative to the casing tube and to the vehicle body continuously, so that the attachment of a motor and gear to drive the adjusting mechanism necessitates additional means which are intended to permit either a stable mounting on the moving adjusting mechanism, or a flexible drive connection.

An underlying object of the invention is to achieve a compact, stable construction and a favorable attachment of a drive means to the adjusting mechanism for an adjusting device of the type described above.

This object is achieved by providing an arrangement wherein a rectangular frame surrounds the casing tube with the inside cross-section of the rectangular frame being fastened to the vehicle body by a frame body wall located transversely to the direction of the inclination adjustment, the side walls of said rectangular frame located at right angles to this body wall serving as guide levers which are connected for this purpose by their end sections to the frame body wall and to a frame bearing wall opposite the frame body wall pivotably in their plane relative to the frame body wall, and wherein the adjusting mechanism, which is mounted stationary on the frame bearing wall, exhibits a fixed angular position with respect to the frame bearing wall and to the casing tube.

According to the invention the necessary steering function is completely separated from the adjusting mechanism, which is linearly driven, mounted stationary and effects a precise adjusting stroke in the direction of-inclination of the steering column.

The frame surrounds and protects the adjusting mechanism and provides a stable bracing for the adjusting mechanism.

According to further features of preferred embodiments of the invention, the adjusting mechanism comprises two screwthreaded spindles which brace the adjusting force uniformly on both sides of the steering column, and which dictate weak adjusting forces in the case of an alignment at right angles to the longitudinal axis of the casing tube in tangential alignment to the radius of inclination.

The outlay for especially preferred embodiments of the adjusting device is also reduced by the fact that only one of the screwthreaded nuts which initiate the adjusting movement into the casing tube is actuated by a drive means, whereas the other screwthreaded nut is rotatable synchronously through a frictional transmission means, such as, for example, a chain.

According to certain preferred embodiments the screwthreaded spindles exhibit a trapezoidal screwthread and the gear exhibits worm wheels, whereby it is possible to use compact motors with high speed and power, the speed of which is reduced by these measures.

Other objects, advantages and novel features of the present invention will become apparent from the following detailed description of the invention when considered in conjunction with the accompanying drawings.

DETAILED DESCRIPTION OF THE INVENTION

Figure 1:
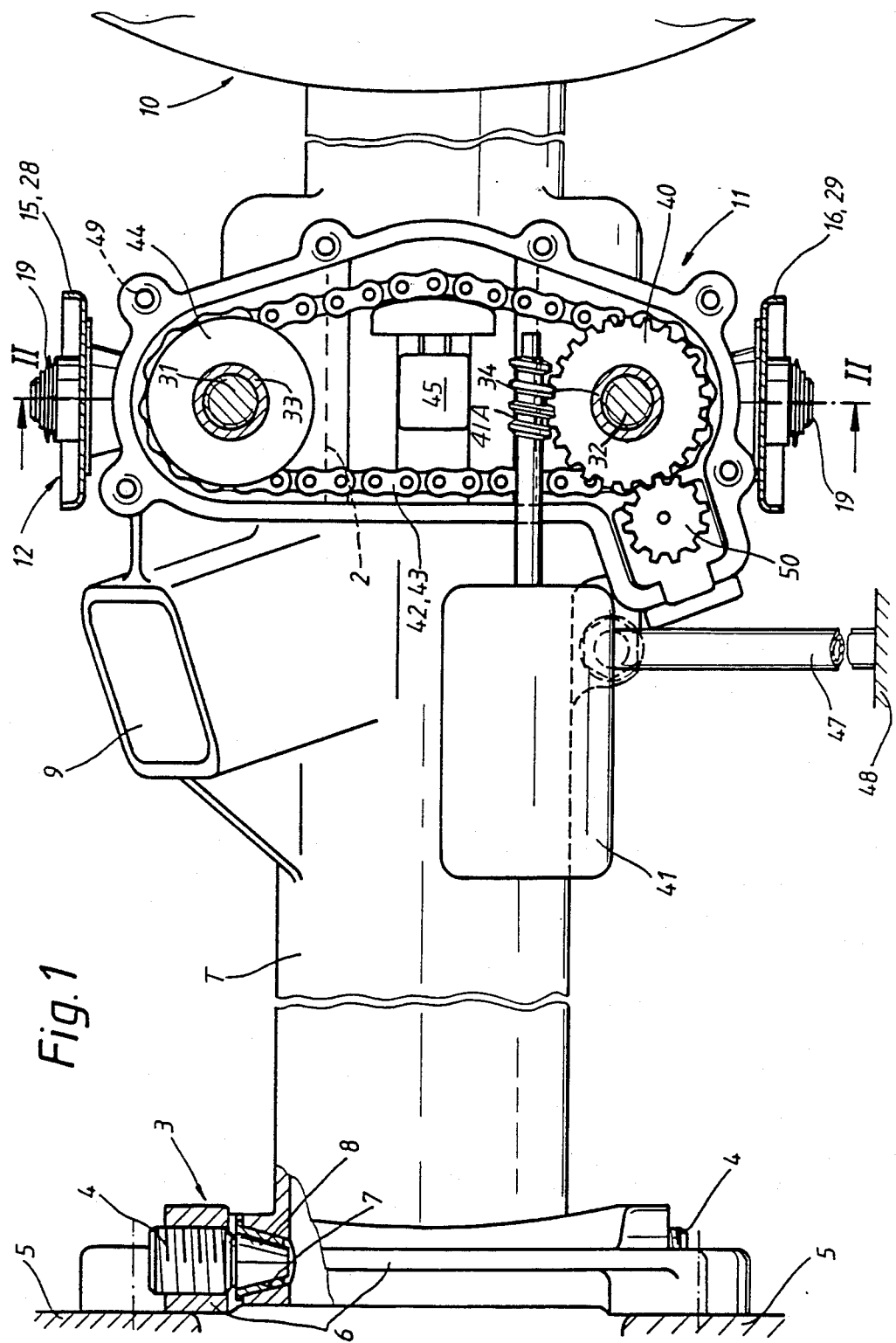
FIG. 1 schematically shows a pivotable steering column with an adjusting device, shown sectioned in the portion depicted in FIG. 2, constructed in accordance with a preferred embodiment of the invention.

FIG. 1 shows a casing tube 1 which accommodates the steering column 2 of a motor vehicle, which is pivotable about a pivot bearing 3 arranged remotely from the steering wheel and is then adjusted in its inclination.

This pivot bearing 3 comprises two bearing bolts 4 located in one axis, which are each screwed radially into a bearing ring 6 screwed to the vehicle body 5 and surrounding the casing tube 1. Bolts 4 are thereby driven with an end cone 7 into a bearing cone 8 in the casing tube 1 until they press against the latter, whereby the circular shape of the bearing ring 6 becomes somewhat deformed ovally and due to this pretension presses back against the bearing bolts 4, which are thus anchored with little play in the bearing cones 8 and provide an axial bracing of the casing tube 1 and a dissipation of the axial forces into the vehicle body 5.

The casing tube 1 also exhibits a housing 9 for a locking bolt, not shown, of a steering wheel locking means.

An impact absorber 10 of a steering wheel, not further shown, is attached to the steering column 2, being located at its end opposite the pivot bearing 3.

Figure 2:
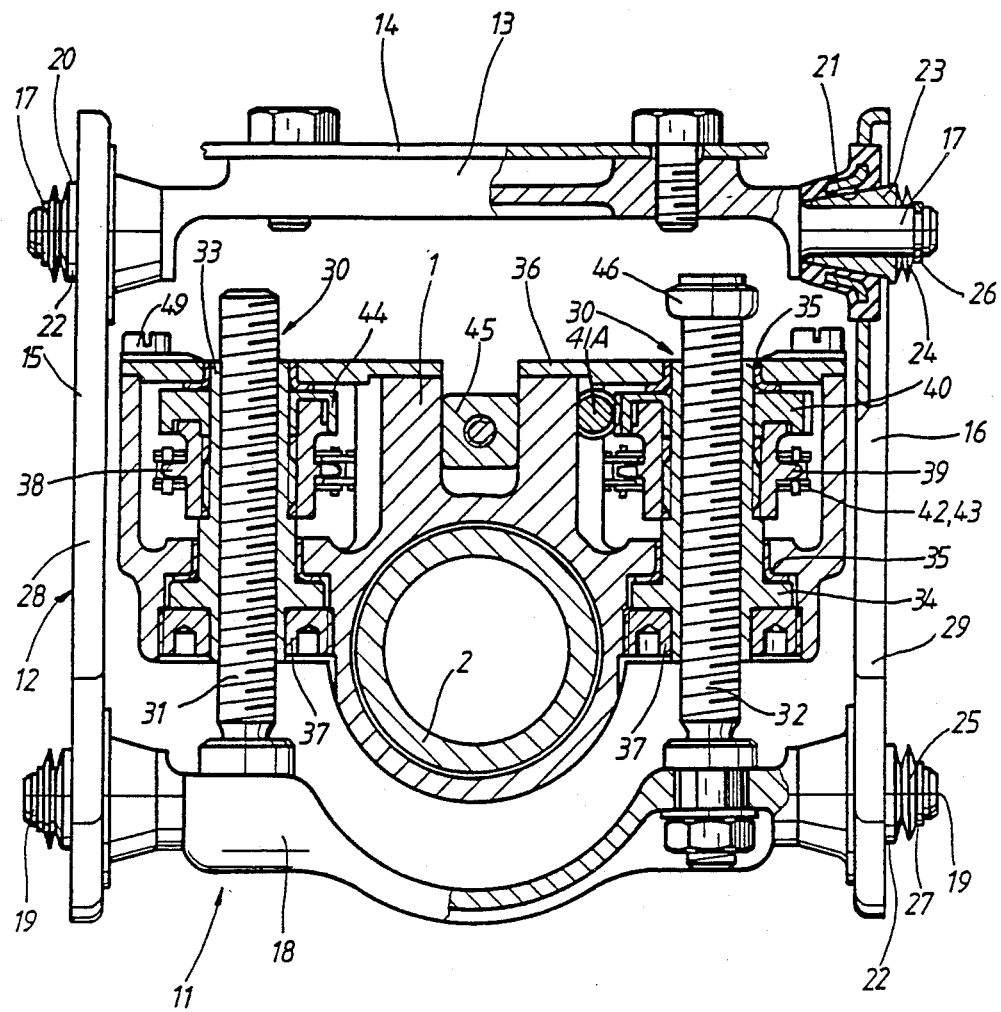
FIG. 2 schematically shows a rotated cross-section taken along the line II—II through the adjusting device of FIG. 1.

An adjusting device 11 shown in FIGS. 1 and 2, for adjusting the inclination of the steering column 2 comprises a square frame 12 which surrounds the casing tube 1. The inside cross-section of frame 12 permits a pivoting movement of the steering column 2. The frame 12 is screwed to the vehicle body 14 via frame body wall 13 located transversely to the direction of the inclination adjustment. Frame side walls 15 and 16 are oriented at right angles to frame body wall 13 and are pivotable in their plane, each about a bearing bolt 17 protruding from the frame body wall 13, and each at the other end about a second bearing bolt 19 protruding from a frame bearing wall 18 opposite the body wall 13. The side walls 15, 16 exhibit in their end sections for this purpose conical receptacles 20, 21 in each of which they receive respective externally conical bushings 22, 23, into the bore of which the bearing bolts 17, 19 respectively fit. After penetrating a bush bore the bearing bolts 17, 19 receive a plate spring 24, 25 and then a locking ring 26, 27, which tensions the plate spring 24, 25, whereby the bushing 22, 23 is pressed by the spring power into the conical receptacle 20, 21 and a low play mounting of the side walls 15, 16 can be achieved. During an adjustment of inclination of the steering column 2, the side walls 15, 16 act as guide levers 28, 29, whereby a sliding stroke of an adjusting mechanism 30 which occurs relative to the vehicle body 14 is permitted. The adjusting mechanism 30 exhibits two screwthreaded spindles 31, 32 mounted fixed in rotation, which are arranged mutually parallel at right angles to the steering column axis on both sides of the steering column 2, and upon each of which a screwthreaded nut 33, 34 is longitudinally slidable by a rotary movement and then rotates the casing tube 1 positively.

The screwthreaded nuts 33, 34 are for this purpose rotatable by bearing bushes 35 relative to the casing tube surface with only slight frictional resistance. The positive engagement is obtained in one direction of adjustment by a retaining cover 36 anchored by screw connections on the casing tube 1, and in the opposite direction by screwthreaded disc 37 perforated on its end face and screwed onto the casing tube 1 in each case.

A gear 38, 39 is anchored on each screwthreaded nut 33, 34, of, which one gear 39 is connected positively to a worm wheel 40 mounted on the screwthreaded nut 34, which is actuated in rotation by a drive motor 41 and worm 41A, and which transfers its position to a potentiometer 50, the resistance value of which is stored in a memory circuit by which a selective position of inclination is automatically adjustable.

The driven rotation of the worm wheel 40 and of the gear 39, besides being transmitted to the screwthreaded nut 34 is also transmitted through a frictional transmission means 42, which is constituted here by a roller chain 43, synchronously to the second gear 38, which is mounted integrally in rotation on the second screwthreaded nut 33, which is thereby slid longitudinally synchronously with the first screwthreaded nut 34. In order to pack the interstice which occurs to the retaining cover 36, a disc 44 identical in dimensions to the worm wheel 40 is also inserted on this side. To facilitate the installation of the roller chain 43, it is provided with excess length and is tensioned for precise torque transmission by a chain tensioner 45.

An advantageous speed reduction of the drive motor 41, besides the worm wheel reduction, is also obtained by the trapezoidal screwthread of the screwthreaded spindles 31, 32. The screwthreaded spindles 31, 32 are mounted fixed in rotation by one end to the bearing wall 18 and occupy a fixed angular position to the latter as well as to the casing tube 1. It is thereby possible to mount the drive motor 41 on a stable casing tube 1.

Another contemplated embodiment provides for transmitting a torque to the screwthreaded spindles and mounting the screwthreaded nuts fixed in rotation in the casing tube.

One of the screwthreaded spindles 32 carries at its other free end a stop 46, against which the screwthreaded nut 34 strikes in this limit position, while the flux of force is advantageously directed in a narrow circle into the stop 46, then into the screwthreaded spindle 32 and back into the screwthreaded nut 34.

Due to the fixed connection of the adjusting mechanism 30 to the casing tube 1 and to the bearing wall 18, the steering column 2 is braced against the vehicle body 14 through the frame 12 in a region preferably close to the steering wheel.

This arrangement of the invention is particularly advantageous for low vibration bracing of the steering column 2 and for an introduction of force to the impact absorber 10, and further into the steering column 2 in the case of an accident.

In order to brace the casing tube 1 against transverse forces which may occur and be introduced through the steering wheel or by rapid closure of the vehicle dore, it is connected by a stationary strut 47 to a lateral bracing column 48 in the vehicle, while the strut 47 is constructed rigid in tension and compression, and soft in flexure and torsion in the direction of inclination of the steering column 2 by an oval configuration.

What is claimed is:

1. Adjusting device to vary the inclination of a steering column of a motor vehicle which controls a pivoting movement of the steering column about a pivot bearing arranged remotely from a steering wheel at a lower region of the steering column, and wherein the movement of the steering column can be effected by an adjusting mechanism which acts in a straight line in the direction of the inclination adjustment and which is connected to a casing tube accommodating the steering column in an upper region of the steering column near the steering wheel, whereby the steering column can be braced against the vehicle body in this upper region, and wherein a sliding stroke of this connection relative to the vehicle body which is dictated by the pivoting movement is permitted by a guide lever mounted articulately to the vehicle body and acting articulately relative to the steering column;

wherein a rectangular frame surrounds the casing tube, with the inside cross-section of the rectangular frame permitting a pivoting movement of the steering column, said rectangular frame being fastened to the vehicle body by a frame body wall located transversely to the direction of the inclination adjustment, side walls of said rectangular frame located at right angles to this body wall serving as guide levers which are connected for this purpose by their end sections to the frame body wall and to a frame bearing wall opposite the frame body wall pivotably in their plane relative to the frame body wall, and wherein the adjusting mechanism, which is mounted stationary on the frame bearing wall, exhibits a fixed angular position with respect to the frame bearing wall and to the casing tube.

2. Adjusting device according to claim 1, wherein the adjusting mechanism comprises two screwthreaded spindles arranged mutually parallel on both sides of the steering column, upon each of which spindles a screwthreaded nut is longitudinally slidable by a driven rotary movement, and wherein the screwthreaded nuts pivot the casing tube frictionally during their longitudinal sliding.

3. Adjusting device according to claim 2, wherein one of the screwthreaded nuts which is actuated in rotation by a drive motor rotates the other screwthreaded nut synchronously through a frictional transmission means.

4. Adjusting device according to claim 3, wherein the drive motor is an electric motor.

5. Adjusting device according to claim 3, wherein the frictional transmission means is a drive chain.

6. Adjusting device according to claim 8, wherein the drive chain is an endless chain.

7. Adjusting device according to claim 9, wherein the drive motor is an electric motor.

8. Adjusting device according to claim 2, wherein the screwthreaded spindles are anchored at right angles to the longitudinal axis of the casing tube.

9. Adjusting device according to claim 2, wherein the screwthreaded spindles exhibit a trapezoidal screwthread, and wherein a drive motor drives a worm wheel which rotates at least one of the screwthreaded nuts.

10. Adjusting device according to claim 9, wherein the drive motor is an electric motor.

11. Adjusting device according to claims 1, wherein the adjusting mechanism provides stable support of the casing tube at the frame bearing wall and separates a steering function from the adjustment function.

* * * * *